(12) United States Patent
Son

(10) Patent No.: US 12,485,025 B2
(45) Date of Patent: Dec. 2, 2025

(54) DEVICES AND METHODS FOR USE DURING KNEE REPLACEMENT SURGERY

(71) Applicant: Jae S. Son, Rolling Hills Estates, CA (US)

(72) Inventor: Jae S. Son, Rolling Hills Estates, CA (US)

( * ) Notice: Subject to any disclaimer, the term of this patent is extended or adjusted under 35 U.S.C. 154(b) by 184 days.

(21) Appl. No.: 18/241,937

(22) Filed: Sep. 4, 2023

(65) Prior Publication Data

US 2025/0073047 A1  Mar. 6, 2025

(51) Int. Cl.
A61F 2/46 (2006.01)

(52) U.S. Cl.
CPC .................. A61F 2/4657 (2013.01)

(58) Field of Classification Search
CPC ...... A61F 2/3886; A61F 2/389; A61F 2/4684; A61F 2/4657; A61F 2002/4666
See application file for complete search history.

(56) References Cited

U.S. PATENT DOCUMENTS

| | | |
|---|---|---|
| 3,714,009 A | 1/1973 | Kleiner et al. |
| 5,197,488 A | 3/1993 | Kovacevic |
| 5,360,016 A | 11/1994 | Kovacevic |
| 5,456,724 A | 10/1995 | Yen et al. |
| 5,470,354 A | 11/1995 | Hershberger et al. |
| 5,656,785 A | 8/1997 | Trainor et al. |
| 7,412,897 B2 | 8/2008 | Crottet et al. |
| 7,575,602 B2 | 8/2009 | Amirouche et al. |
| 7,632,283 B2 * | 12/2009 | Heldreth ................ A61B 5/103 606/102 |
| 7,651,500 B2 | 1/2010 | Supper et al. |
| 8,197,489 B2 | 6/2012 | Chessar et al. |
| 8,661,893 B2 | 3/2014 | Stein et al. |
| 8,679,186 B2 | 3/2014 | Stein et al. |
| 8,696,756 B2 | 4/2014 | Stein et al. |
| 8,926,530 B2 * | 1/2015 | Stein ..................... A61B 5/686 600/587 |
| 9,492,238 B2 | 11/2016 | Stein et al. |
| 9,585,615 B2 * | 3/2017 | Singh ................... A61B 5/4851 |
| 9,820,678 B2 | 11/2017 | Stein et al. |
| 9,844,335 B2 * | 12/2017 | Stein .................... A61B 5/4528 |
| 10,172,723 B2 | 1/2019 | Fisher et al. |
| 10,863,995 B2 | 12/2020 | Nielsen et al. |
| 2005/0256527 A1 | 11/2005 | Delfosse et al. |
| 2009/0005708 A1 | 1/2009 | Johanson et al. |
| 2010/0332152 A1 * | 12/2010 | Stein ....................... A61B 8/15 702/41 |
| 2015/0106024 A1 | 4/2015 | Lightcap et al. |
| 2020/0375760 A1 | 12/2020 | Paszicsnyek |
| 2021/0259713 A1 | 8/2021 | Trabish et al. |

\* cited by examiner

Primary Examiner — Anu Ramana
(74) Attorney, Agent, or Firm — Boris Leschinsky

(57) ABSTRACT

A knee alignment measurement tool for use during a total knee replacement surgery may include the following main components: a sensor assembly, a display unit configured to power up, operatively control the individual sensors of the sensor assembly, and display the readings therefrom, and a flexible cable operatively connecting the sensor assembly to the display unit. The sensor assembly may include a rigid base supporting a circuit board, a left sensor and a right sensor positioned adjacent to the left center, and a cover sealed to the rigid base to enclose the left sensor and the right sensor, wherein the cover does not abut the rigid base during the compression of the sensor assembly.

18 Claims, 15 Drawing Sheets

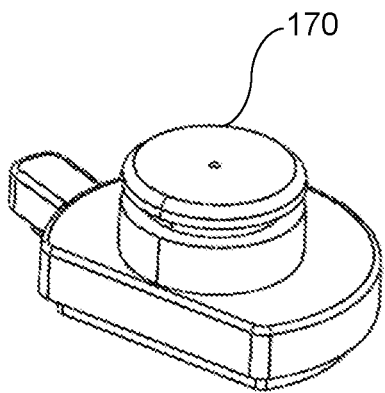
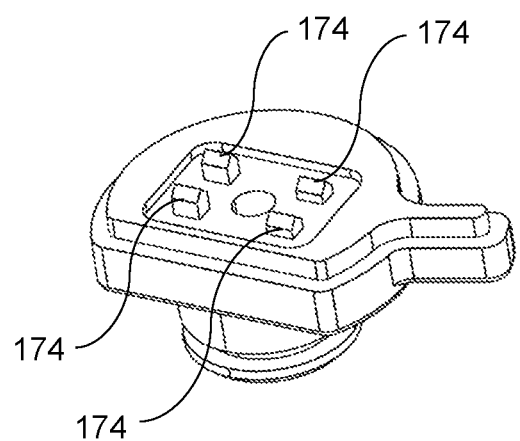
Fig. 8                                      Fig. 9
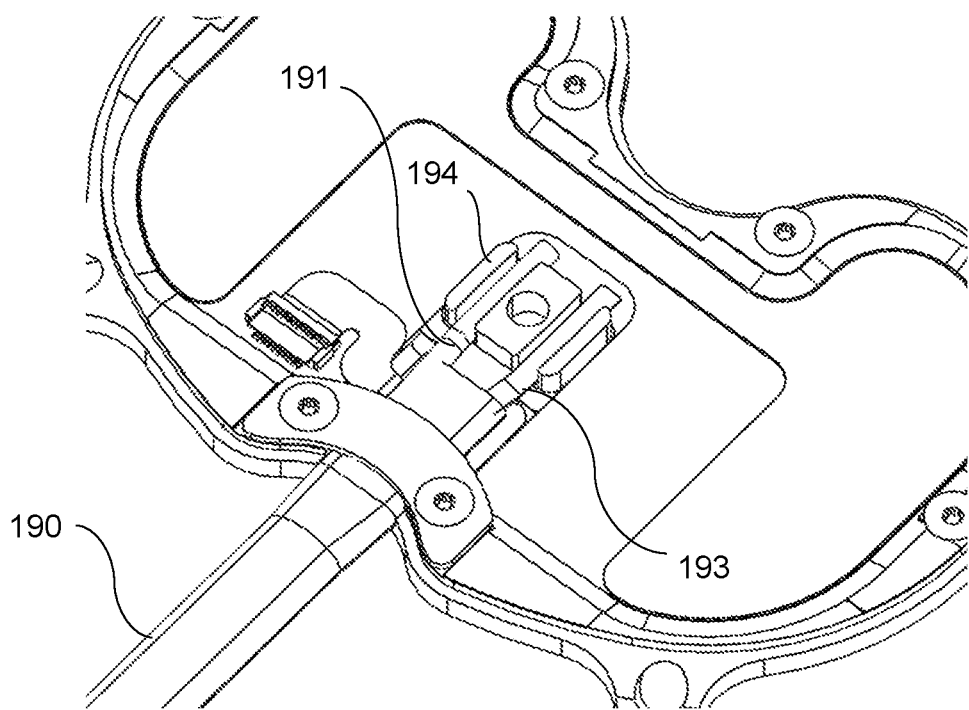
Fig. 10

DEVICES AND METHODS FOR USE DURING KNEE REPLACEMENT SURGERY

BACKGROUND

Without limiting the scope of the invention, its background is described in connection with various devices and methods that may be used during knee replacement surgery. More particularly, the invention describes devices and methods for measuring orthotic fit, as well as the balance and consistency of forces on the adjacent condyles through a range of knee motion.

Knee arthroplasty, or knee replacement surgery, has long aimed to restore pain-free knee functionality. Knee replacement surgery is a complex procedure designed to alleviate pain and restore functionality to a knee joint damaged by injury or degenerative conditions like osteoarthritis. It involves several critical steps, with a primary focus on achieving a balance of forces on the knee prosthesis across the entire range of motion, ensuring longevity and a pain-free operation of the artificial knee.

The balance of forces is achieved during surgery by meticulous attention to detail and precise alignment of the artificial components. The surgeon will assess the ligaments, tendons, and other soft tissues to ensure they are properly tensioned. Imbalanced positioning of the knee may cause complications such as instability or uneven wear on the prosthesis.

The artificial knee components are implanted once the joint is prepared and balanced. This typically involves fixing a metal femoral component to the end of the thigh bone and a tibial component to the top of the shin bone, with a plastic spacer in between to mimic the function of natural cartilage. If necessary, the patella (kneecap) may also be resurfaced.

After implantation, the surgeon must meticulously check the range of motion and the alignment of the knee, making any necessary adjustments to ensure that the forces are evenly distributed across the prosthesis. Achieving this balance minimizes stress on the implant and surrounding tissues, which is essential for the longevity and pain-free operation of the artificial knee.

Achieving balance in total knee replacement surgery involves a range of tools and techniques, each with its own set of detriments and limitations. Alignment guides assist in proper positioning but may face challenges in cases of unusual patient anatomy. Trial implants are crucial for fine-tuning balance but might not perfectly predict outcomes with actual implants. Computer-assisted surgery systems enhance precision but require specialized equipment and training. Gap balancing techniques adjust soft tissue tension but demand surgical expertise and can lead to over-correction or under-correction. Sensor-guided implants offer real-time feedback but are relatively new, with evolving long-term outcomes. Intraoperative imaging like X-rays or fluoroscopy confirms alignment but exposes it to radiation and may not capture soft tissue tension comprehensively. Patient-specific instrumentation relies on pre-operative imaging and may not adapt to intraoperative changes.

The need, therefore, exists for better tools to be used during knee replacement surgery, aimed at achieving a balance of forces and proper operation of a knee prosthesis for a wide variety of patients.

As part of the problem, there is a need for complete parallelism of the cuts on the tibia and femur bones. Achieving this parallelism is essential for the longevity and functionality of the replacement knee. Modern cutting tools, such as computer-assisted navigation systems and robotic-assisted surgery, have significantly improved the precision of these cuts. They provide real-time feedback to the surgeon, enabling precise alignment and ensuring that the bone cuts are parallel, which is critical for optimal implant placement. However, limitations still exist with the current approach. These tools can be expensive and require specialized training, making them less accessible to some medical facilities. Additionally, patient-specific factors and anatomical variations may not always be fully accounted for, necessitating the need for even more advanced and adaptable tools in the future to achieve the highest level of precision and parallelism in bone cuts during knee replacement surgery. Developing new tools that combine the advantages of modern technology with affordability, adaptability, and ease of use will be crucial for further enhancing surgical outcomes in this field.

SUMMARY

Accordingly, it is an object of the present invention to overcome these and other drawbacks of the prior art by providing a novel precision knee alignment tool configured to provide feedback during knee replacement surgery on compression forces between components of a knee replacement prosthesis.

It is another object of the present invention to provide a knee alignment tool configured to provide feedback on the balance of forces between a left condyle and a right condyle of the knee prosthesis.

It is a further object of the present invention to provide a novel knee alignment tool in which compression forces are measured accurately throughout the range of motion of the knee prosthesis.

It is yet a further object of the present invention to provide a novel knee alignment tool configured to cause compression forces to affect only the respective pressure sensor readings and not be distorted by interference from the housing containing the pressure sensors.

A knee alignment measurement tool for use during a total knee replacement surgery may include the following main components: a sensor assembly, a display unit configured to power up, operatively control the individual sensors of the sensor assembly, and display the readings therefrom, and a flexible cable operatively connecting the sensor assembly to the display unit. The sensor assembly may include a rigid base supporting a circuit board, a left sensor and a right sensor positioned adjacent to the left center, and a cover sealed to the rigid base to enclose the left sensor and the right sensor, wherein the cover does not abut the rigid base during the compression of the sensor assembly.

In embodiments, the rigid base of the sensor assembly may further feature a side wall surrounding the left sensor and the right sensor. The cover may be sized to fit inside the side wall of the rigid base with a predefined gap in between, which may be sealed with a compliant adhesive.

The cover of the sensor assembly may contain at least one thicker portion surrounded by at least one thinner portion to allow the thicker portion to transmit compression force applied on top thereof without affecting the remaining areas of the cover.

In further embodiments, the cover of the sensor assembly may include a first thicker portion surrounded by a first thinner portion and located above the left sensor of the sensor assembly. Furthermore, the cover of the sensor assembly may also include a second thicker portion surrounded by a second thinner portion and located above the right sensor of the sensor assembly. This design may cause the compression of the left sensor through the cover of the sensor assembly, which does not affect the compression of the right sensor thereof.

In further embodiments, the thicker portions extend above the top surface of the cover and below the bottom surface thereof, thereby defining the portions of the cover that transmit compression forces to the sensors of the sensor assembly during knee replacement surgery.

A gooseneck cable comprises a jacket containing a flex interconnect and a malleable wire configured to allow for diverse orientation and positioning of the display unit during the knee replacement surgery. The flex interconnect comprises a plurality of electrical connections between the sensor assembly and the display unit. The malleable wire may be a copper wire with a hemispherical cross-sectional shape. The malleable wire may extend from the sensor assembly through the jacket of the gooseneck cable into a loop retained in the display unit, and back through the jacket of the gooseneck cable to the sensor assembly, thereby facilitating the use of the gooseneck cable as a pull tail of the sensor assembly.

A test and calibration apparatus is described to be used for calibrating the sensor assembly of the knee alignment device. The test apparatus may comprise a kinematic mount with provisions to accept different sensor assemblies in a consistent manner and apply the forces at various predetermined positions on the sensor assembly using a loading plate.

A calibration algorithm is described to be used during the calibration process in order to process various locations and levels of forces. The forces are applied using the loading plate in different predetermined positions of the sensor assembly 110. The calibration algorithm weighs the force that's being applied at the center more heavily than the forces applied over the sensing elements when the load is not balanced.

A novel exoskeleton-type stiffness measuring mechanism is described to be used along with the knee alignment device. The stiffness measurement device may comprise a pair of parallel linear actuators, a pair of rotating joints, at least one of them is equipped with a locking button, and a leg attachment fastener, such as a Velcro strap configured to be wrapped about the leg of the patient so as to mount the stiffness measuring mechanism thereon. In use during surgery, the stiffness measuring mechanism may be configured to apply a controlled amount of deflection by extending one or both linear actuators to measure the stiffness of the knee joint, while the knee alignment device facilitates the force measurement in between the knee joint.

A force-sensing glove is described as comprising a plurality of force-sensing components and a built-in inertial measurement unit which may be used to measure displacement while the surgeon applies a force to the knee joint. The force-sensing glove may be configured to measure both force and displacement during manual deflections of the knee joint by the surgeon, which allows an automated calculation of the knee joint stiffness.

Finally, a dual-blade cutting saw is described having a pair of parallel blades separated by a replaceable spacer configured to change the distance between the blades. Once the bones of the patient are positioned and retained in a desired final alignment, the novel saw may be used to provide both cuts of the respective bones at the same time, thereby facilitating proper positioning of the knee prosthesis and improving the longevity of the knee prosthesis pain-free function over the full range of motion.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 is a top perspective view of the center post of the sensor assembly 110, FIG. 9 is a bottom perspective view of the same, FIG. 10 is a partial perspective view of the joint between the gooseneck cable and the sensor assembly of the invention.

DETAILED DESCRIPTION OF PREFERRED EMBODIMENTS OF THE INVENTION

Figure 1:
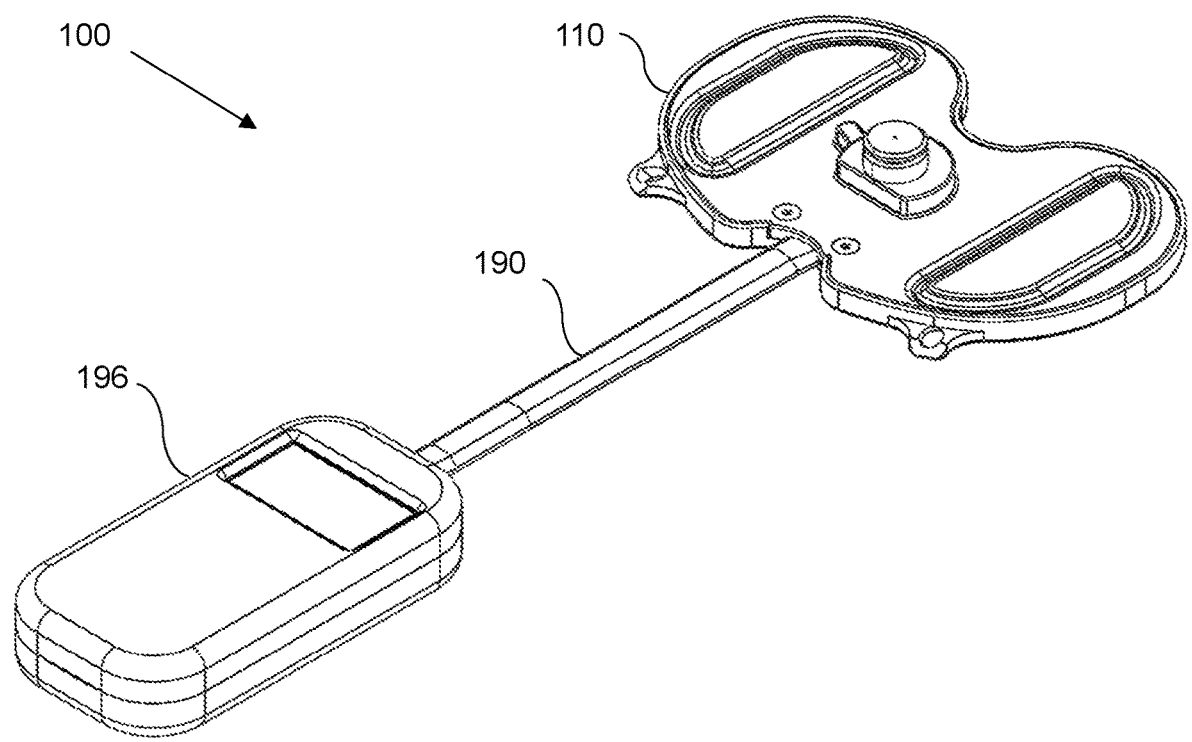
FIG. 1 is a perspective view of the knee alignment device 100.

The following description sets forth various examples along with specific details to provide a thorough understanding of the claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring the claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and make part of this disclosure.

During a knee replacement surgery, the surgeon removes the damaged parts of the knee joint, including the cartilage and bone, and replaces them with artificial components made of metal, plastic, or ceramic. The goal is to create a new joint that functions like a normal knee joint, with a smooth range of motion and stability. More specifically, the surgeon initially prepares the patient's bone(s) to receive the orthopedic prosthesis. To do so, the surgeon may resect a portion of the patient's proximal tibia to which the tibia tray will be attached, and a portion of the patient's distal femur to which the femoral component will be attached. During such procedures, the surgeon may attempt to balance or otherwise distribute the joint forces of the patient's joint in order to produce joint motion that is similar to the motion of a natural joint. To do so, the surgeon may use surgical experience and manually "feel" for the appropriate joint force balance. Additionally, or alternatively, the orthopedic surgeon may use surgical instruments, such as a ligament balancer in the case of a knee replacement procedure, to assist in the balancing or distributing of joint forces.

The amount of force and tension that a knee joint can withstand during a knee replacement surgery depends on various factors, such as the patient's age, weight, activity level, and overall health. Generally, surgeons aim to restore the normal biomechanics of the knee joint during surgery, which involves applying appropriate forces and tensions to the joint. The forces and tensions applied during surgery can also vary depending on the surgical technique and the type of implant used. Generally, the forces applied to the knee joint during surgery range from 120 to 250 Newtons, depending on the specific surgical approach and implant used.

One of the tools that may be used during this part of the surgery is a knee alignment tool. The precision knee alignment tool is used during surgery to be placed between a metal femoral component at the end of the thigh bone and a tibial component to the top of the tibia bone. Prior art devices describe a variety of such tools; for example, in the U.S. Pat. Nos. 5,197,488; 5,360,016; 5,456,724; 5,470,354; 5,656,785; 7,195,465; 7,412,897; 7,575,602; 7,632,283; 7,591,854; 8,551,023; 10098761; 10206792; 11051955; and 11096801. These tools generally have a sensor assembly including two lobes, each containing a sensor configured to measure the force between the individual portions of the knee replacement joint. A common feature of many of these designs is the presence of a clam-shell housing containing the sensor portion of the device. The top portion of the "clamshell" is positioned over the bottom portion thereof such that the edge of the sidewall of the top portion abuts the edge of the side wall of the bottom portion. This causes a limitation of performance in that the load path goes through the injection molded housing. In other words, compression of the top portion of the clamshell housing interferes with the bottom portion. Dimensional variability of the injection molded parts is usually excessive to provide consistent performance, in that one part of the housing affects the other part and distorts the force transmitted to the actual sensor located within the housing itself.

The first described part of the present invention is a novel precision knee alignment tool 100 shown in general in FIG. 1, which comprises a sensor assembly 110 connected to a display unit 196 by a flexible gooseneck cable 190. Additional drawings showing different elements of the design of the knee alignment tool are seen in FIGS. 2-6 accompanying this disclosure.

The main innovative feature is the absence of the clamshell rigid housing that limits the extent of the performance of the tool. Instead, a precisely machined metal or rigid plastic base 120 is used to house all other sensing and cover components assembled on top thereof in a "floating" manner so as to not interfere with other components. The performance of the sensor portion of the device, in this case, is not limited by the rigid features and elements of the base 120.

Figure 2:
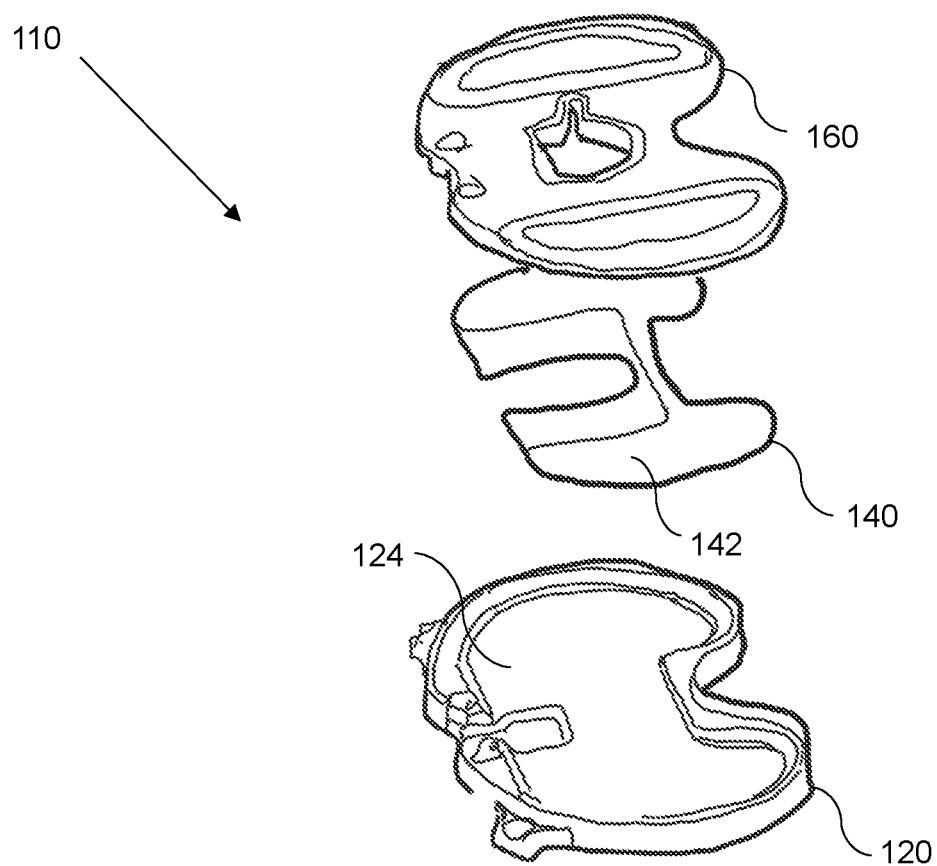
FIG. 2 is an exploded view of the sensor assembly 110 of the device 100.
Figure 3:
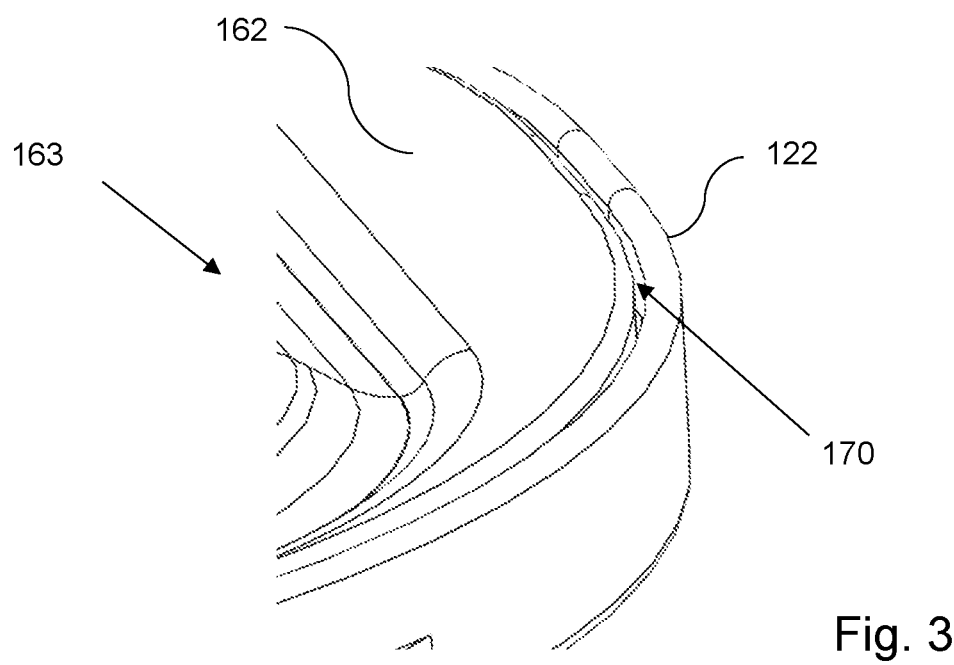
FIG. 3 shows a close-up perspective view of the components of the sensor assembly 110.

A better appreciation of this design may be gained with reference to FIG. 2, which shows an exploded view of the main elements of the sensor assembly 110. The rigid base 120 may have a flat dual-kidney-shaped depression 124 with a side wall 122 surrounding thereof and forming a cavity for positioning a sensor subassembly 140 and the sensor cover 160 therein. The rigid base 120 may be made from a rigid material such as plastic or metal. In other embodiments, the rigid base may have a metal plate secured on top of the flat depression 124 and configured to serve as a supporting member for the sensors of the sensor assembly 110. A sensor subassembly 140, in turn, may include a "floating" flexible printed circuit board 142 containing a pair of a left sensor and a right sensor positioned thereon. Kapton or another flexible substrate of the flexible PCB 140 may be selected such that the performance of the left pressure sensor is not affected by compression and the performance of the right pressure sensor. Both sensors may reside on a precisely machined flat surface 124 of the base 120 (see FIG. 6). The sensor subassembly 140 may be positioned on top of the base 120 in such a manner that the left sensor is mechanically isolated from the right sensor and compression of each sensor may be registered by these sensors individually, without cross-interference.

To further assist in de-coupling one sensor from another, a convoluted cover 160 may be used to protect the sensor subassembly above thereof. Several features of the cover 160 design may be helpful in achieving this objective. First, the cover 160 may be dimensioned to fit inside the side wall of the base with a small gap 170 between the base wall 122 and the periphery 162 of the cover 160 (see FIGS. 3 and 6). This small gap may be filled with a flexible and highly compliant adhesive (for example, Nusil Med-1 silicone adhesive manufactured by NuSil Technology LLC, Carpinteria, CA) to seal the internal cavity of the device and prevent moisture ingress from outside. The extent of adhesive compliance may be selected to be sufficiently high so as to not interfere with a small movement of the cover 160 relative to the wall 122 over a range of compression forces of up to 250 N.

Secondly, the cover 160 may be made with thicker sections and thinner sections as described below. A pair of thicker sensor cover portions 166 may be made to be positioned over the corresponding left and right sensors to accurately transmit the pressure thereon. Each thicker sensor cover portion 166 may be molded to have flat parallel top and bottom surfaces so as to facilitate compression of the sensor therethrough. The thickness and the Young modulus of that portion may be selected to be stiff enough not to change its shape under a maximum load expected to be applied (such as up to 250 N, or even higher for a suitable safety margin, such as up to 450 N), while, on the other side, being soft and flexible enough to transmit compression without imparting any forces on the adjacent sensor.

In embodiments, the cover 160 of the sensor assembly 110 may include a first thicker portion 167*a* surrounded by a first thinner portion 164*a* and located above the left sensor of the sensor assembly 110. The cover 160 of the sensor assembly 110 may further feature a second thicker portion 167*b* surrounded by a second thinner portion 164*b* and located above the right sensor of the sensor assembly. This arrangement may be used to ensure that compression of the left sensor through the cover 160 of the sensor assembly 110 does not affect compression of the right sensor thereof, see FIG. 4.

A thinner flexible portion 164 may surround the thicker stiff portion 167 so as to act as a living hinge around thereof and further mechanically isolate one sensor from the other. In other words, a thinner wall 164 of cover 160 will absorb any small motion resulting from the compression force over the corresponding sensor and will not cause any distortion of the position of cover 160 over the adjacent pressure sensor, therefore facilitating its independent measurement of the compression forces applied thereto. Transition 163 from the thicker portion to the thinner portion may be gradual or stepwise, as seen in examples in FIGS. 3 and 4.

Finally, a thicker yet outer periphery portion 162 may be helpful to attach the cover 160 to the base 120 in a more reliable manner via an adhesive or by other suitable means and techniques.

In one example, medical-grade polypropylene family of materials may be selected to be used as a biocompatible material for cover 160 with Young's modulus in a range from about 1,325 MPa to about 2,000 MPa, such as at least 1,325 MPa, at least 1,500 MPa, at least 1,750 MPa, or up to 2,000 MPa. The thickness of the thinner portion 164 may range from about 0.4 mm to about 0.6 mm, such as at least 0.4 mm, at least 0.45 mm, at least 0.5 mm, at least 0.55 mm, or up to 0.6 mm. This range may vary depending on the material and manufacturing techniques. The lower end of the range is limited by selecting a reliable manufacturing technique that can be used to produce a thin enough portion 164 without failure. The high end of the range is defined by a thickness that still allows the unrestricted flexing of the thinner portion 164 as described above. The range of thickness for a thicker portion 167 made from polypropylene may be in a range from about 1.5 mm to about 3 mm, such as at least 1.5 mm, at least 2 mm, at least 2.5 mm, or up to 3 mm. The lower end of the range is guided by the requirement of the thicker portion 167 to be stiff enough to not allow for any material movement under compression of up to 250 N, or even up to 450 N with a suitable safety margin. The upper end of the thickness is limited by the overall thickness of the sensor assembly 110. In the case of the industry standard overall thickness of the sensor assembly 110 of 4.1 mm, the upper end of the range for the thickness of the thicker portion 167 may be about 3 mm so as to allow sufficient room for other components of the sensor assembly 110 to be stacked up with the cover 160 and not exceed the allowable thickness of the device.

Importantly, the thinning of the cover 160 wall along the area 164, that surrounds each sensor allows the cover 160 portion 166 to be the only component that makes contact with the underlying corresponding sensor and transmits the compression force encountered by the knee joint. Therefore, the floating design of the thicker portions 167*a* and 167*b* and the mechanical isolation of each pressure sensor leads to a better and more independent force measurement by each sensor, which is critical during the checking of the balance of the knee joint throughout the range of knee motion.

Figure 4:
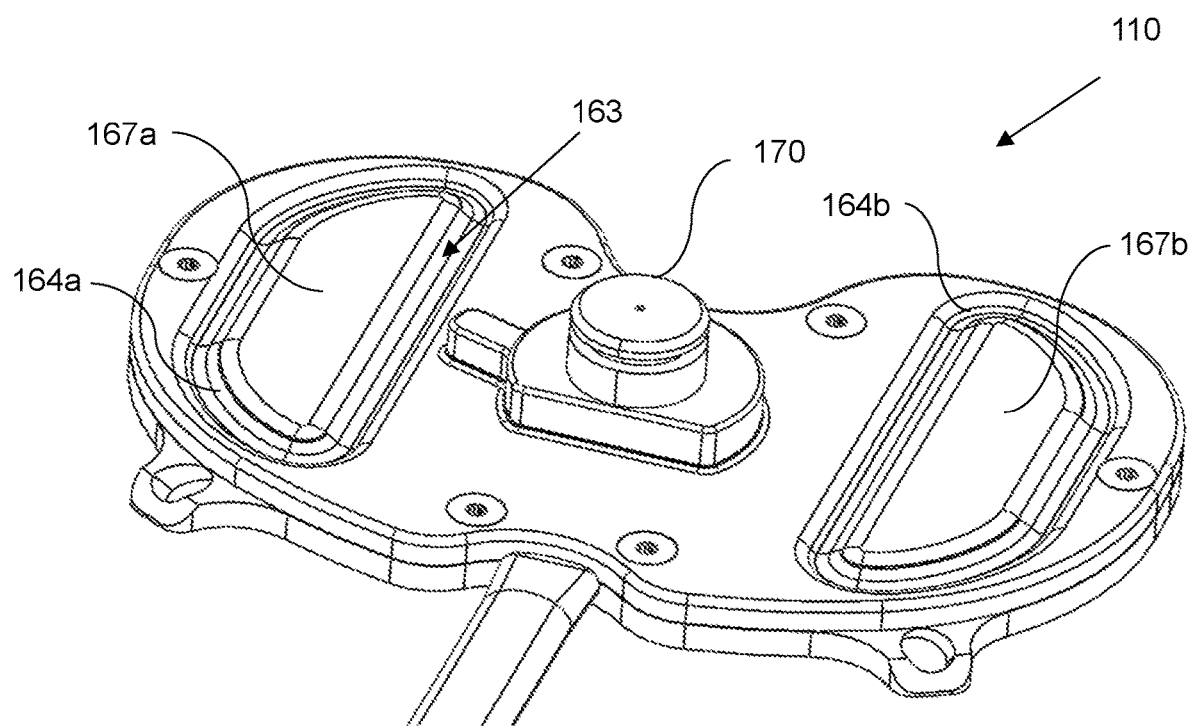
FIG. 4 is a more detailed perspective view of the sensor assembly 110.
Figure 5:
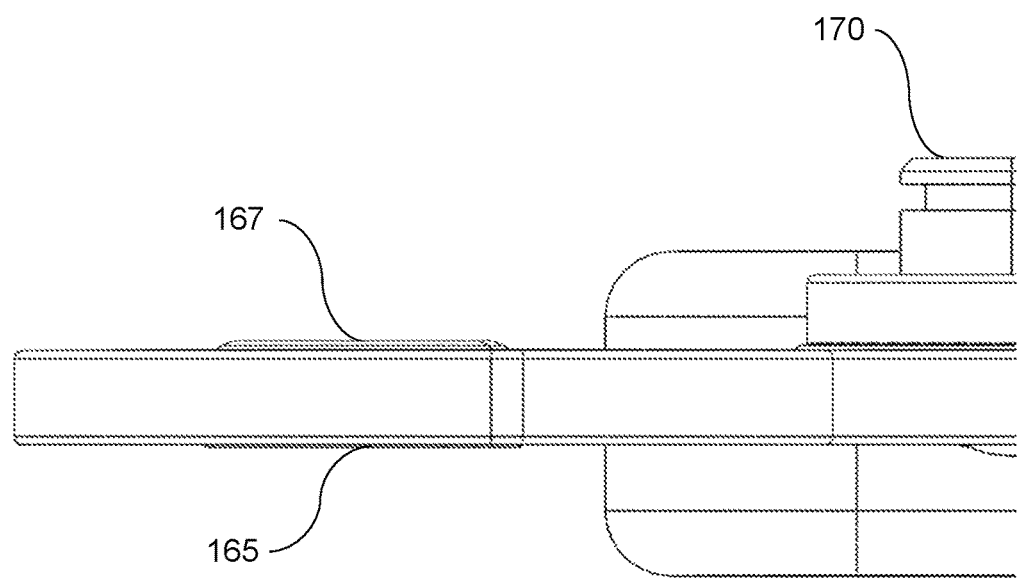
FIG. 5 is a close-up cross-sectional view of the sensor assembly 110.
Figure 6:
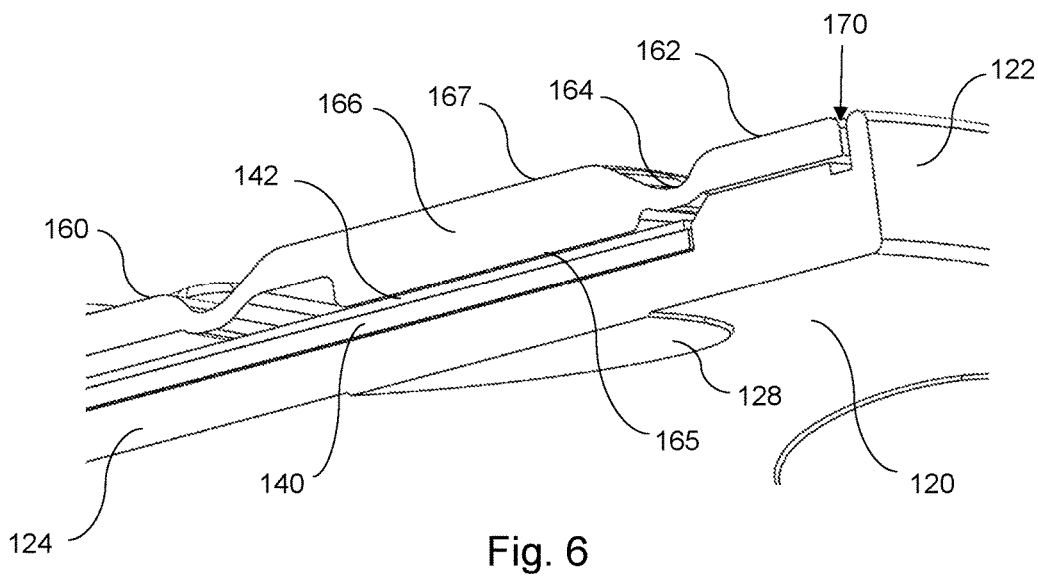
FIG. 6 is a close-up cross-sectional perspective view of the sensor assembly 110.

To further ensure that only portion 166 is in contact with both the loading element on top of the device and the pressure sensor located underneath the cover 160, the top oval- or kidney-faced faces 167*a* and 167*b* of the cover portion 166 may be raised above other top surfaces of the adjacent structures, while the lower oval- or kidney-shaped face 165 may be lowered below other structures of the cover 160—see FIGS. 4, 5 and 6. The thicker portions 166, therefore, extend above the top surface of the cover 160 and below a bottom surface thereof. This design assures a force transmission to be concentrated only on the thicker portions 166 and not over the entire top surface of the cover 160. Thicker portions 166 may, therefore, flex and move toward and away from the base 120 independently of the rest of the cover 160 over the range of motion expected to independently transmit compression forces during the knee replacement surgery. No force is transmitted to the sidewall 122, which may be made to end below the face 167 of the cover 160. To further isolate the compression area to the area of device 100 corresponding to the sensor location, the base 120 may have a pair of feet 128 protruding downward and away from the base 120, each shaped similarly to the face 167 of the thicker portions 166 and located under each of the two corresponding right and left sensors of device 100. This allows the entire stack-up of the sensor assembly 110 (from the top thicker portion 166—to the sensor—to the base 120 with the protruding feet 128) to concentrate force transmission only on the area of the respective sensors.

Figure 7:
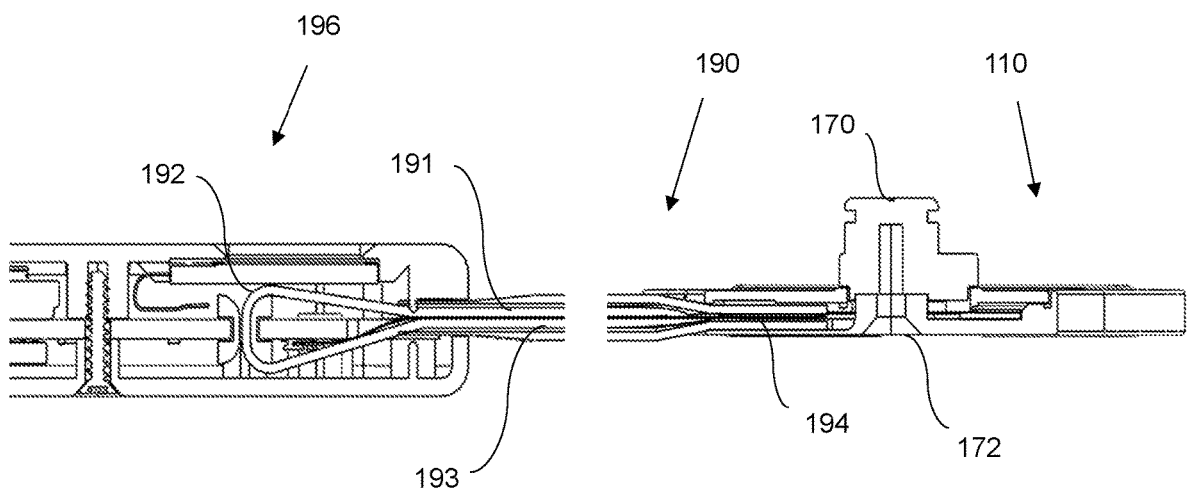
FIG. 7 is a cross-sectional view of the device 100 showing the details of the gooseneck cable 190.

Gooseneck malleable cable 190 is seen in a cross-section view in FIG. 7. The gooseneck cable 190 is an assembly comprising a medical-grade outer jacket containing a flex interconnect with a plurality of electrical connections between the sensor assembly and the electronics in the display unit 196, and a malleable copper wire 191 that may be, in some examples, hemispherical in cross-sectional shape. The copper wire 191 may extend from the sensor assembly 110 through the jacket of the gooseneck cable to the display unit 196. It can then form a loop 192 around the printed circuit board of the display board and then be fed as wire 193 through the outer jacket (wire 192) along with the flex interconnect. The copper wire 193 may be clamped back at the sensor assembly 110 at clamp 194.

Figure 11:
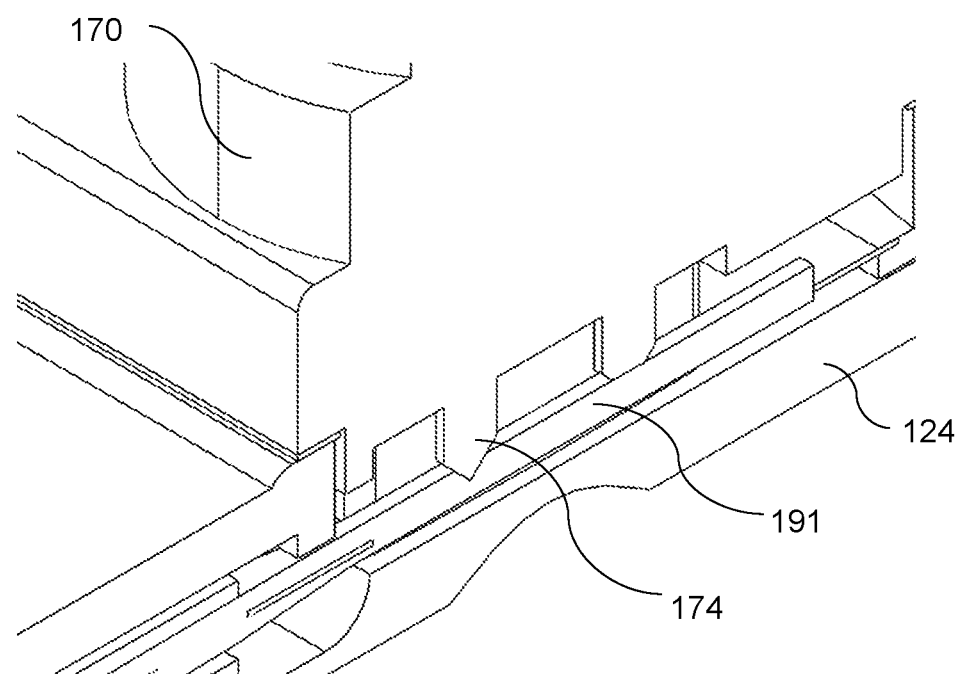
FIG. 11 is a partial cross-sectional perspective view of the same.

FIGS. 8 and 9 show the top and the respective bottom views of the center post 170. One or more claws 174 may be positioned on the bottom surface thereof such that when the center post is assembled onto the sensor assembly 110 and retained by a center screw 172, the claws 174 bite into the soft copper wires 191 and 193 against the clamp base 194 (see FIG. 4 as well as FIG. 10, center post 170 is removed) in order to retain the gooseneck cable 190 together with the structural base 120 of the sensor assembly 110. A close-up cross-sectional view of the cable assembly 110 at the location of the copper wires 191 and 193 is seen in greater detail in FIG. 11.

Figure 12:
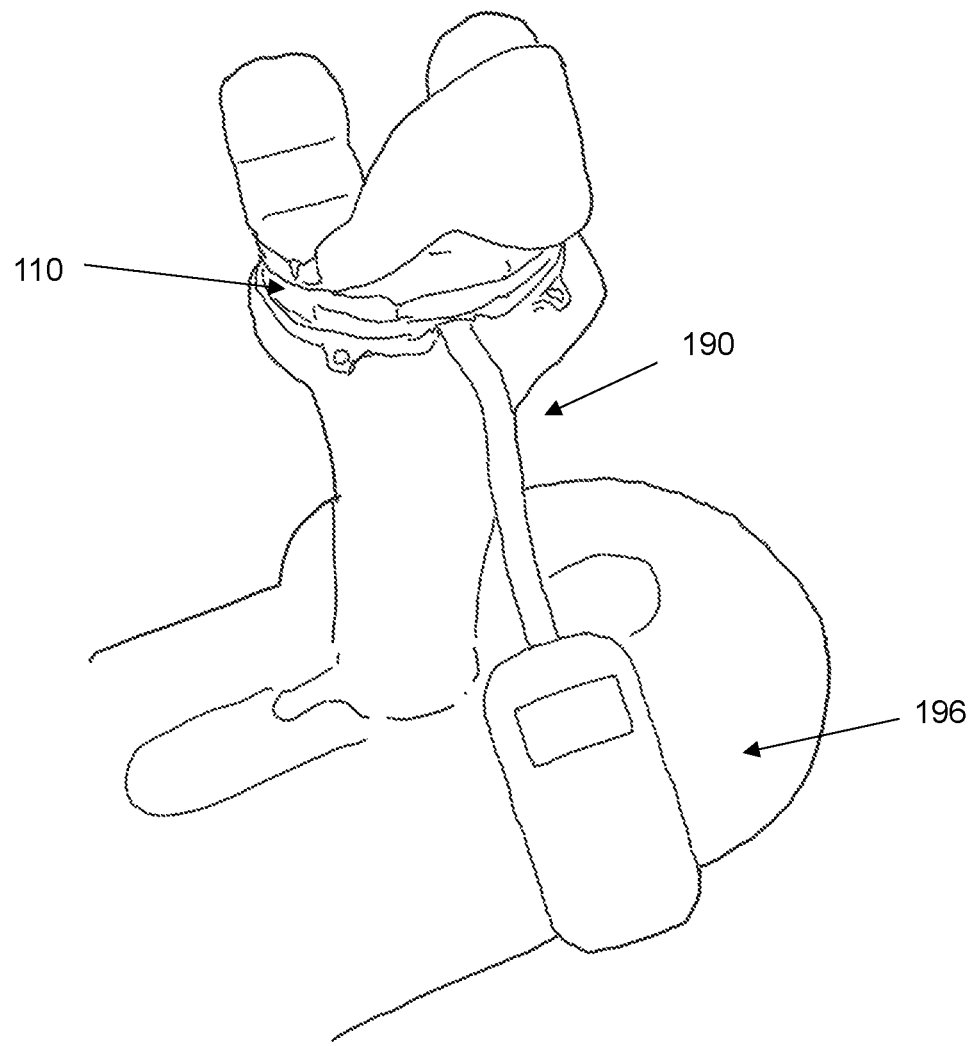
FIG. 12 shows a diagram of the knee alignment device in use.

The presence of the copper wire helps the cable assembly 190 to have a malleable behavior, which allows for diverse orientation and positioning of the display unit 196 at different points during the surgery and regardless of the position of the sensor assembly 110, as seen better in FIG. 12. Independent attachment of the malleable wire to both the sensor assembly 110 as well as to the display unit 196 not only increases the pull strength of the cable 190 and reliability of a fragile flex interconnect contained therein; it also facilitates the use of the gooseneck cable 190 as a pull tail of the sensor assembly 110 during use.

The display unit 196 may include a source of power (a battery) and be configured to electrically power up the sensors of the sensor assembly 110. The display unit 196 may contain further control electronics to operate the sensors and a display to show their respective readings to the surgeon during the orthopedic surgery.

In addition to providing superior performance based on the design of the device outlined above, individual calibration may be used to further improve the performance of the tool of the present invention. A calibration device 200 and methods described below and shown in FIGS. 13-15 may provide an instrument suitable for performing such calibration.

In addition to controlling the load path through the sensor of the knee alignment device, it is critical that the test apparatus 200 do the same to obtain precision results. A loading plate may be applied on top of the sensor loading bars to accept forces anywhere on the loading plate. While the load to the sensor assembly 110 gets applied by two condyles during surgery, only one force is applied during calibration using force balance assumptions. For example, applying force in the middle should be equivalent to applying half the force equally on the right pressure sensor and the left pressure sensor.

Figure 13:
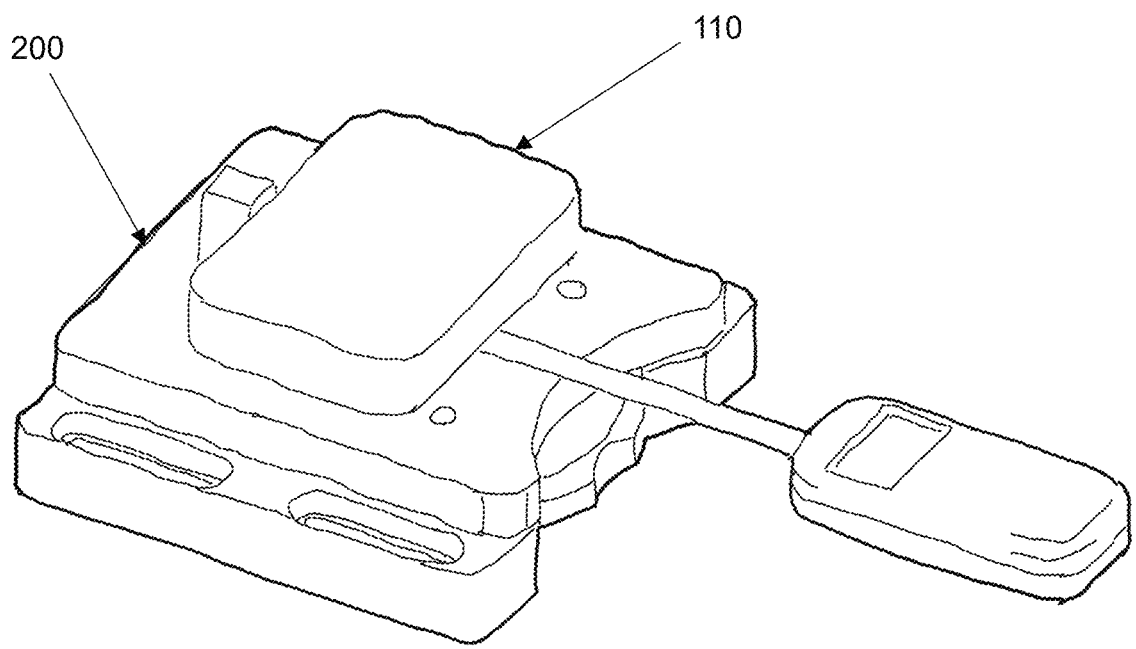
FIG. 13 shows a diagram of the knee alignment device positioned over a calibration instrument.

The sensor assembly itself may be positioned using two pins that go through the two mounting holes shown in FIG. 13. A spring-loaded pin may push the sensor to take up any clearance between the hole in the pin. That mechanical assembly is part of a kinematic mount 200, so that different size sensors can be placed and replaced in a very consistent manner.

Broadly speaking, a kinematic mount is a precision mechanical system designed to precisely position and support an object, often used in optical and scientific instruments. It employs a set of precisely shaped and arranged components, such as spheres, pins, or wedges, which allow for controlled and stable movement in a specific direction while constraining motion in other unwanted degrees of freedom. Kinematic mounts are crucial in applications where precise alignment and stability are essential, such as in laser systems, telescopes, and microscopy setups. By providing controlled motion while minimizing vibrations and unwanted shifts, kinematic mounts ensure accurate and repeatable positioning, enabling the optimal performance of sensitive equipment in scientific and industrial settings.

Another key feature for improving the performance device is to focus on the nominal desired case where the forces are balanced between all the elements. The accuracy of the load measures will be greatest when the load is applied directly over the sensing element. However, it is desired to have an increased accuracy when the loads are applied equally among all four elements. This is done by developing an algorithm that weighs the accuracy of the desired balanced position to be higher than the outline cases because the sensing elements are located on the four corners of the sensor assembly.

Figure 14:
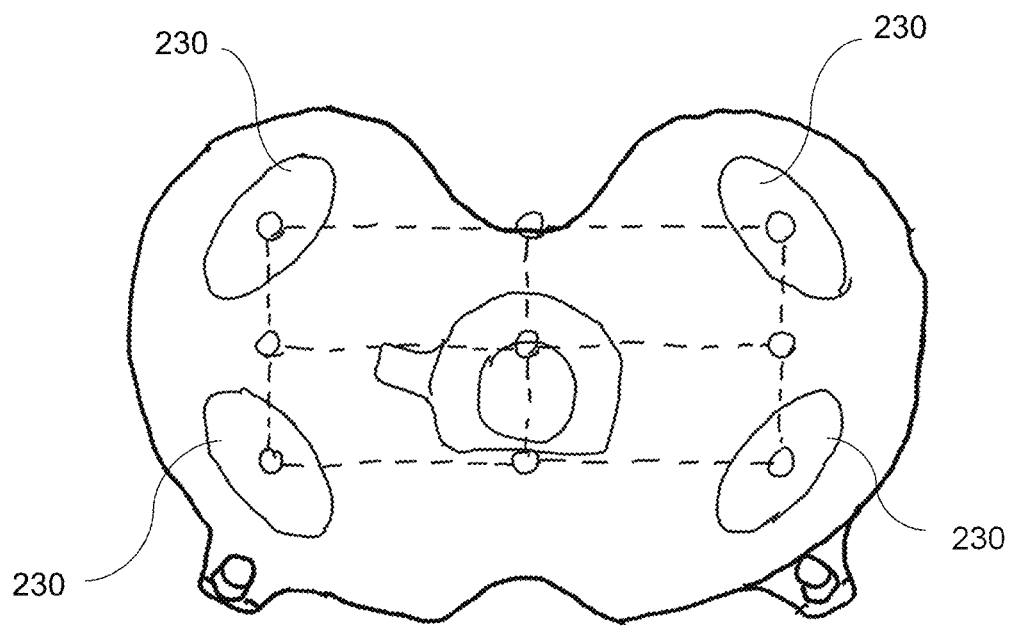
FIG. 14 shows a schematic location of force application during calibration of the knee alignment device 100.

During the calibration process, forces are applied at various locations 230 with the aid of a loading plate that may be positioned on top of the sensor assembly 110, see FIG. 14. Forces in the middle, in between, and directly over the sensing elements are applied at various force levels to calibrate the force and force centroid position.

Figure 15:
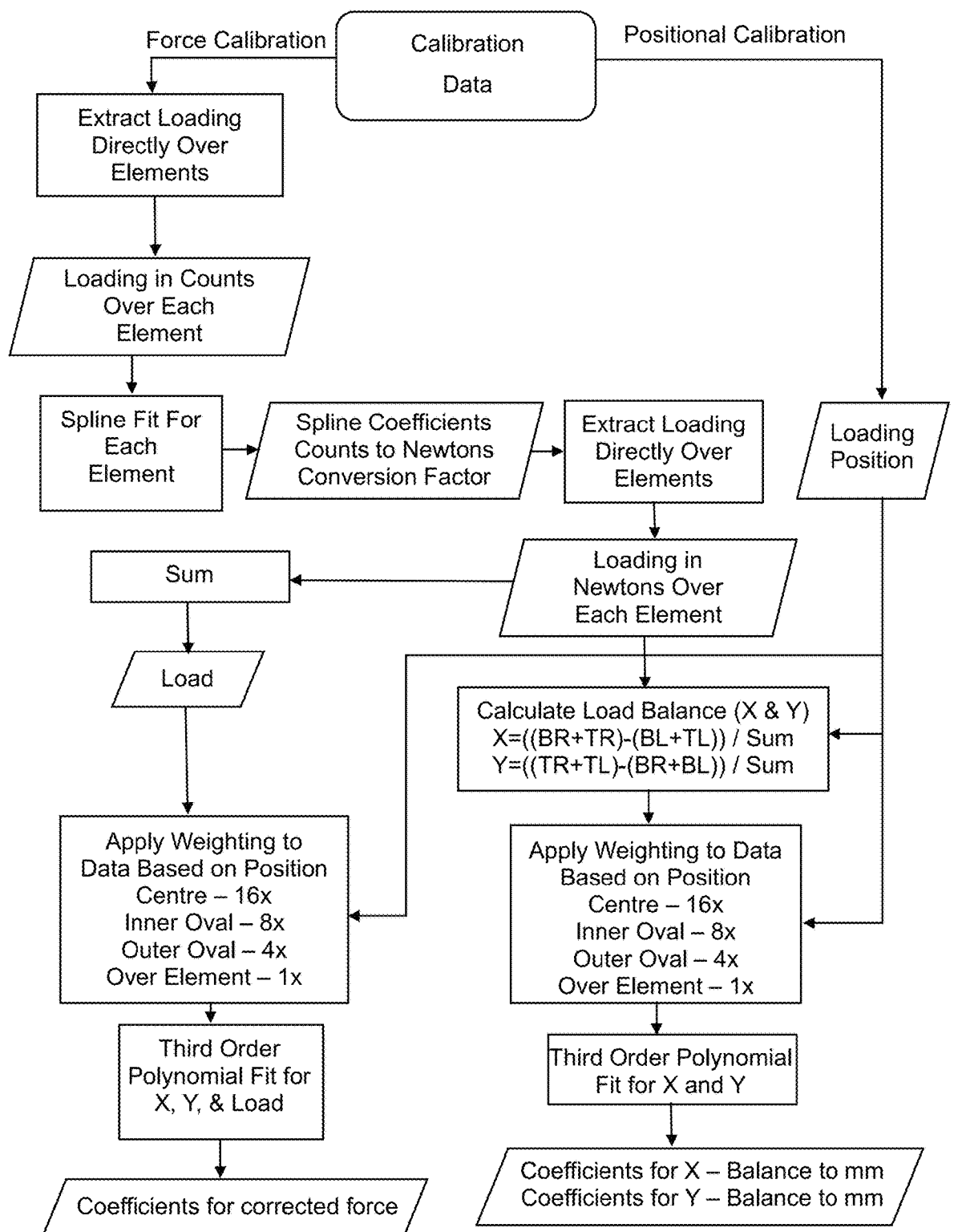
FIG. 15 shows an exemplary algorithm used during the calibration procedure.
Figure 16:
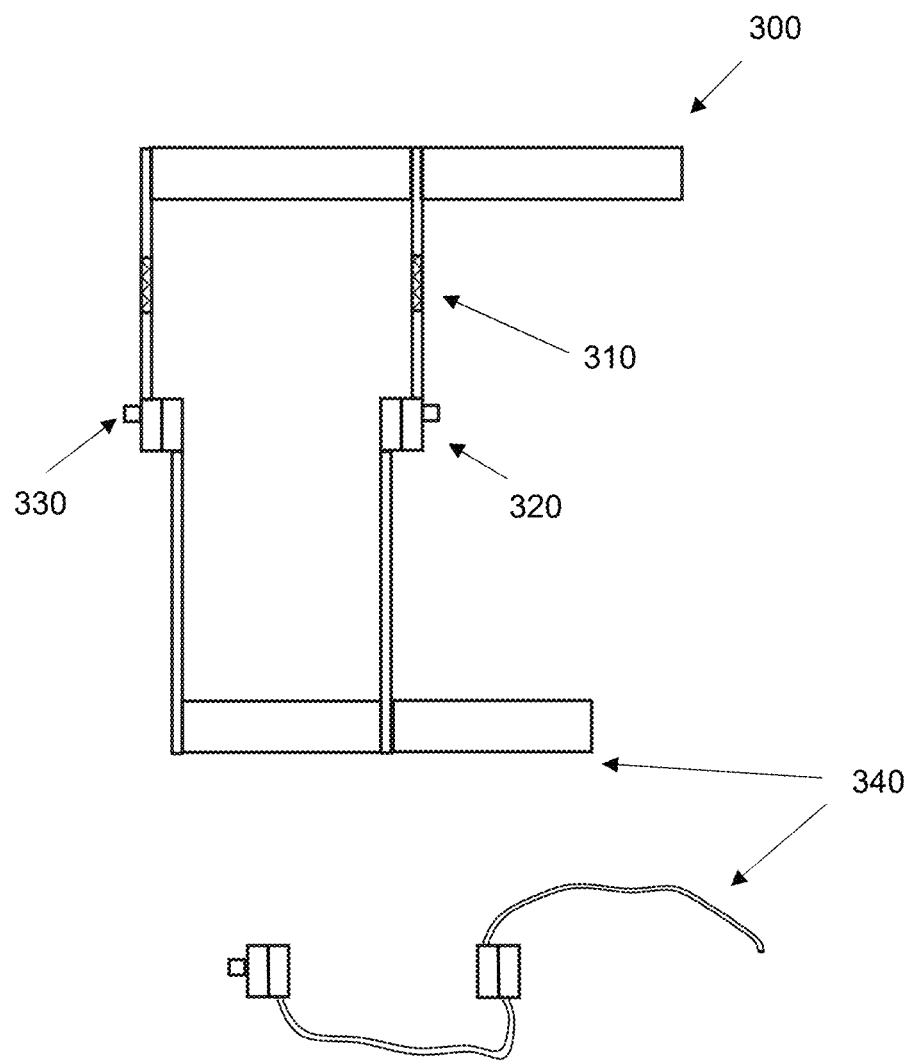
FIG. 16 is a schematic view of the knee joint stiffness measurement device of the present invention.
Figure 17:
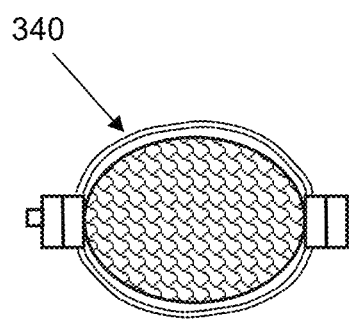
FIG. 17 is a cross-sectional view showing an attachment of the stiffness measurement device to a leg during surgery.

FIG. 15 presents an exemplary algorithm that may be used during the calibration process in order to process various locations and levels of forces applied using the loading plate in different positions of the sensor assembly 110. Since the objective of the knee replacement surgery is to have a balanced loading between the left and the right condyle and to know the total force applied during this condition, it is more important to know the force accurately when the load is balanced. Therefore, the calibration algorithm weighs the Force that's being applied at the center more heavily than when forces are being applied over the sensing elements, i.e. the load is not balanced. Forces applied outside the sensing element locations are considered invalid.

As shown in FIG. 15, the calibration for the system involves creating three key components:
1. Per-element calibration splines for converting raw counts from each element into force,
2. A polynomial fit for X & Y to convert load balance calculations into mm offsets from the center of the device, and
3. A polynomial fit that corrects the summed force from each of the four elements based on the position calculated by the position of force applied onto the sensor.

To calculate the parameters for the calibration, a calibration routine may be applied to the sensor within a controlled apparatus capable of providing known forces at known locations to the device under testing, as shown in FIGS. 13 and 14. At each loading point of the calibration, the position and force of the applied load are recorded along with the output of the sensor. To calculate the conversion from raw counts (uncalibrated sensor output) to force for each of the elements, the loading taken directly above each of the four elements is taken from the full set of data, such that there exist four subsets of calibration data consisting of applied force and sensor outputs for each of the elements when loaded.

Initially, this data is checked to verify that all four sensors are providing an output in raw counts under the same load to within X % of each other and not outside a nominal range of X+/−Y counts. This initial screening ensures that all four elements are operating correctly and within their expected tolerance.

Once the loading data over the elements is validated, a spline is then fitted, giving a means of conversion for each of the raw output counts to force. Here, the calibration can be calculated to determine the load position. This is done by means of calculating the load balance and applying a polynomial fit to refine the accuracy and convert it into mm space.

The load balance is calculated by:

a. $X_{balance} =$ (BottomRight + TopRight)−(BottomLeft + TopLeft) BottomRight + TopRight + BottomLeft + TopLeft b. $Y_{balance} =$ (TopLeft + TopRight) − (BottomLeft + BottomRight) BottomRight + TopRight + BottomLeft + TopLeft To emphasize the fit of the polynomial around the center of the device, where accuracy is paramount, the data is weighted based on the location; it may also be grouped into four spatial regions corresponding to the corners of the sensors.

The center of the device, an inner oval, an outer oval, & the loading directly over the elements may be used to further adjust the data. In one example, based on the location, the data is replicated prior to being fitted by the following weightings:

a. Centre—16×
b. Inner Oval—8×
c. Outer Oval—4×
d. Over Elements—1×

Two polynomials are then fitted, one for the Y-axis using the Y-location of the applied in mm as the value being fitted to and the weighted $Y_{balance}$ data as in input. Likewise, a similar procedure may be conducted for the X-axis using the $X_{balance}$ and X load locations.

Finally, to refine the force value, a polynomial is fitted using the same weightings as with the load locations however, the independent variables being inputted to the fitting are the X-location and Y-location of the load in mm, and the summed total of the calibrated output of the four elements. The resulting output is a polynomial equation that corrects for force based on the load location.

The spline parameters for converting from counts to force, the X & Y position polynomials, & force refinement polynomial coefficients may then be sent to the device's onboard memory, the device reset, and a set of loadings at various positions may then be performed to verify the output of the device.

This portion of the specification describes novel tools designed to check the stiffness of the knee joint. Being able to do so during surgery is critical to patient satisfaction because a joint that is too loose causes instability, and a joint that is too tight causes stiff joints. Both can cause pain, and, if the tension on the left versus right condyle is not symmetrical, it can cause uneven and premature wear of the joint.

Whether a total knee replacement surgery is performed by traditional methods or with robotic assistance, the accuracy of the knee joint alignment depends on the cut and the thickness of the shim. The Precision Knee Aligner 100 described above is designed to provide immediate feedback to the surgeon on the compressive force between the knee joint as well as the balance between the left and right condyle. However, the surgeon cannot control the leg motion precisely to determine the axis and lateral stiffness of the joint. Literature research shows that the axis stiffness of the knee joint should be 100-1000 N/mm, and angular stiffness should be 0.1-1.5 Nm/deg.

A novel exoskeleton-type stiffness measuring mechanism 300 is proposed by the present invention that can be strapped to the patient's leg, using a Velcro strap or another suitable attachment method. It can apply a controlled amount of deflection to measure the stiffness of the knee joint, while the Precision Knee Aligner 100 provides the force measurement in between the knee joint.

Figure 18A:
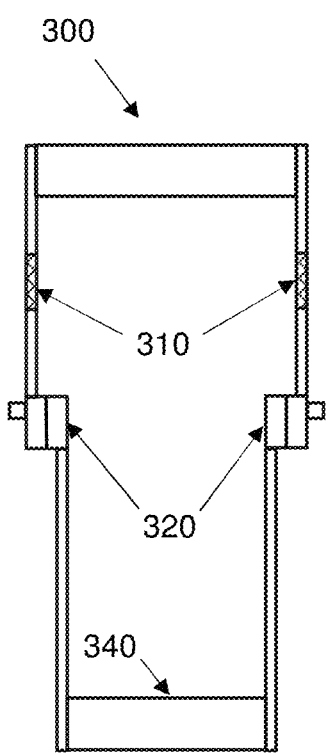
FIGS. 18A, 18B, and 18C show the stiffness measurement device of the invention in various use positions.
Figure 18B:
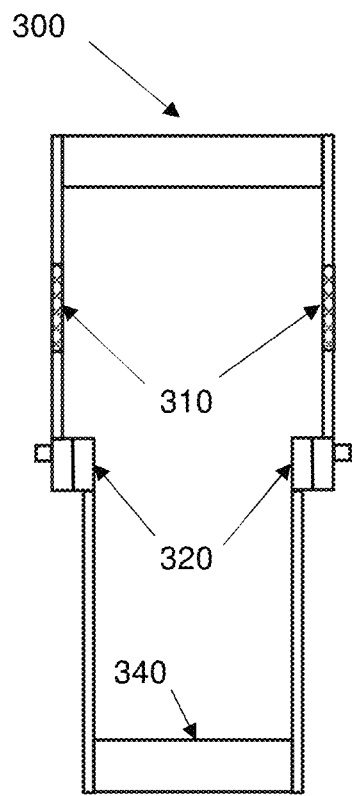
Figure 18C:
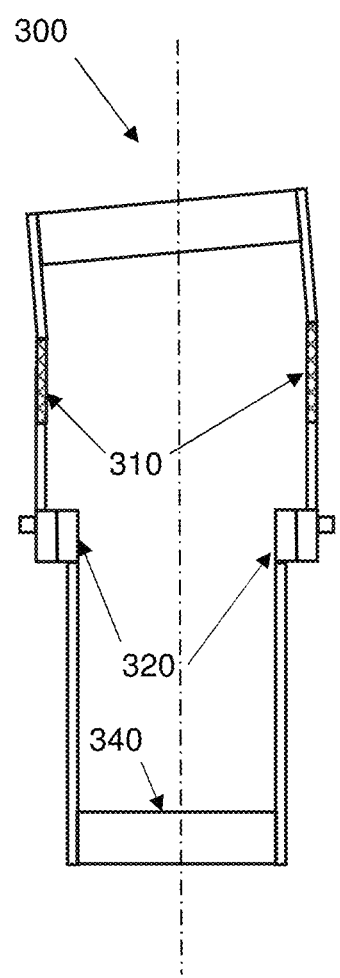

Measuring the medical lateral stiffness of the joint by rotating the joint perpendicular to the range of motion while measuring the angle can provide insight into the stiffness of the knee system. FIGS. 16, 17 and 18A through 18C show the device 300 components, including a pair of parallel linear actuators 310, a pair of rotating joints 320, at least one of them is equipped with a locking button 330, and an attachment fastener 340, such as a Velcro strap shown in use around the bone of the knee in FIG. 16. A rotating joint 320 that can be locked and linear actuators 310 on each side can make positional displacements to measure the force using the knee alignment device 100. Device 300 can be used to apply a controlled displacement to measure knee joint axial and angular stiffness in a consistent and repeatable manner after being applied to the patient. Various positions are shown in FIGS. 18, including a normal position in FIG. 18A, a linearly extended position in FIG. 18B, and a tilted position in FIG. 18C.

Figure 19:
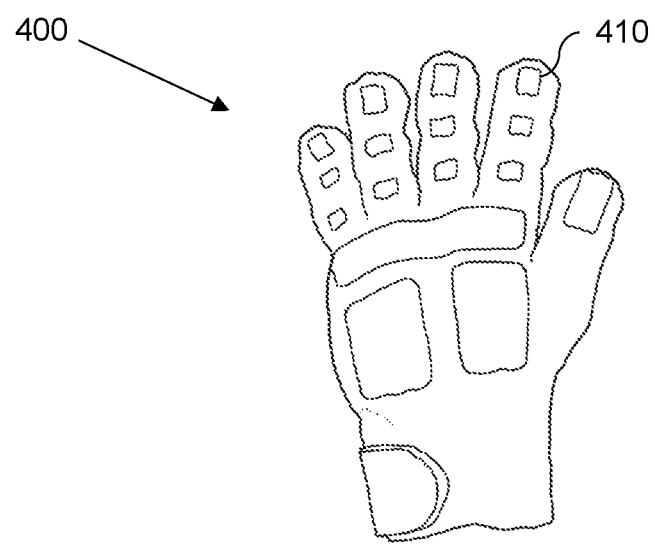
FIG. 19 shows a novel glove of the invention configured to measure force during knee replacement surgery.

A further useful tool that can provide objective force measurements is seen schematically in FIG. 19. While an exoskeleton system 300 that straps onto the patient's knee and leg could provide more accurate measurements of the angle and stiffness of the knee joint, it may be is a more cumbersome procedure for the surgeon to deal with. Another method of measuring the stiffness while mimicking what a surgeon currently does is to instrument the surgeon's hand with a force-sensing glove 400 equipped with a plurality of force-sensing components 410. Since the force the surgeon needs to measure is just one value, the number of sensing elements 410 is not critical, and the glove design can be simplified to measure the force on the palm only with a single sensor 410. Using a built-in inertial measurement unit may be used to measure displacement while the surgeon applies a force to the knee joint. In that case, the glove 400 may be configured to measure both force and displacement, which allows an automated calculation of the knee joint stiffness.

The following portion of the specification describes the issues surrounding knee alignment steps taken during surgery and the tools proposed to assist in bone cutting during these steps as part of the present invention.

Precise alignment of the knee prosthesis is a central factor that determines the success of this procedure and plays a substantial role in ensuring the longevity of the implant, refining knee biomechanics, and ameliorating postoperative functions.

Figure 20:
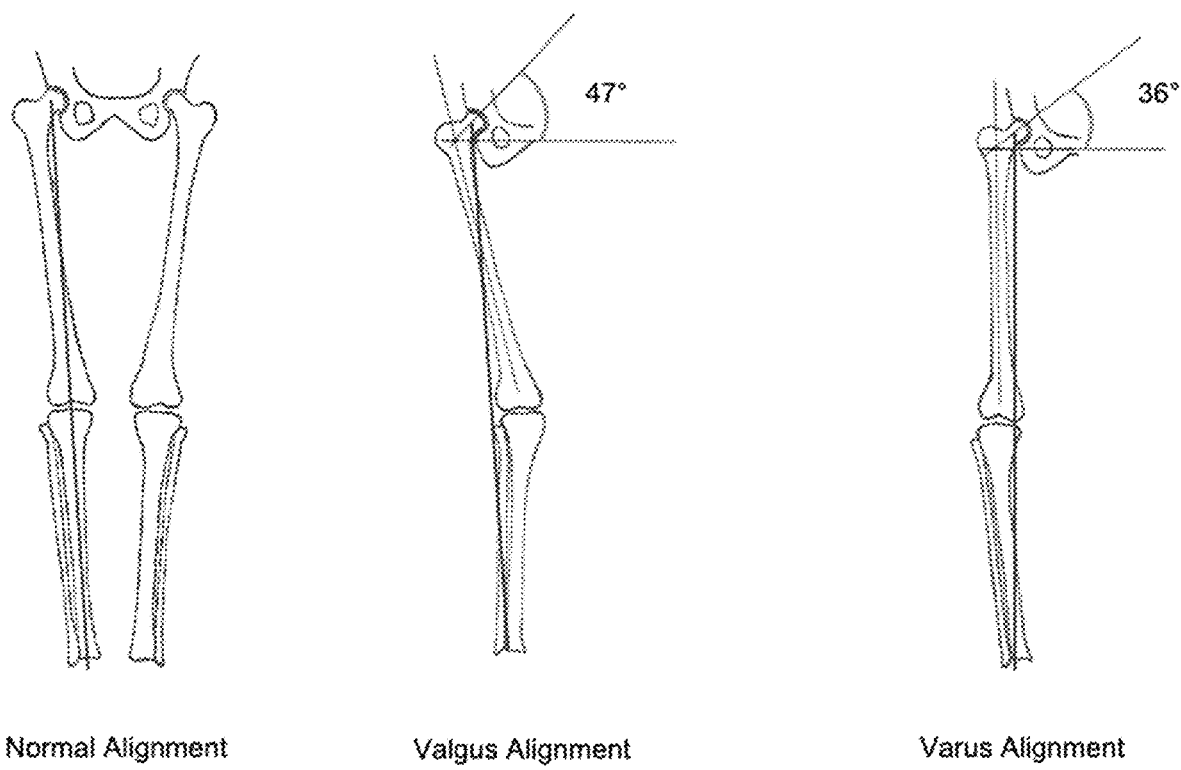
FIG. 20 shows various alignment views for the bones during orthopedic surgery.

Traditionally, the orthopedic community has practiced various alignment philosophies. One conventional method is mechanical alignment. This technique seeks to align the prosthesis components to manifest a neutral mechanical axis of the limb, which is approximately 0°+3° varus/valgus, see FIG. 20. While this method is historically accepted and boasts long-term success in numerous cases due to its predictability, it might not be ideal for every patient. Some reports suggest a heightened risk of aseptic loosening or early wear because the alignment might not mirror the patient's most "natural" stance.

Emerging from the traditional method, the anatomical or kinematic alignment has gained traction. This alignment approach aims to emulate the patient's native or pre-disease knee alignment, which may incline slightly towards the varus or the valgus rather than be a strict mechanical neutral. By respecting individual anatomy, there's a potential promise of offering postoperative kinematics that feels more intuitive and natural to the patient. However, it is less rooted in historical practice and necessitates meticulous preoperative planning. The longevity and wear of this technique remain subjects of continued research.

Another progressive technique is soft tissue alignment, which underscores the equilibrium of soft tissues, including ligaments and tendons, during the positioning of prosthetic components. The allure of this method is the potential to yield a balanced knee, possibly leading to enhanced postoperative functions and patient contentment, complemented by a more organic range of motion. Yet, it's worth noting the technical demands of this approach, requiring seasoned expertise for consistency and risking potential over-tightening or over-releasing of structures.

In the orthopedic arena, opinions have evolved over time concerning the optimal alignment strategy for total knee arthroplasty. Although mechanical alignment has remained a benchmark for years, contemporary research and clinical experiences are advocating the merits of anatomical and soft tissue alignments. Many surgeons now champion a customized approach, adapting the alignment strategy to a patient's unique anatomy and requirements. However, the overarching consensus on a universally "best" alignment technique remains elusive, necessitating continued research and review of emerging evidence-based practices for a holistic understanding.

Figure 21:
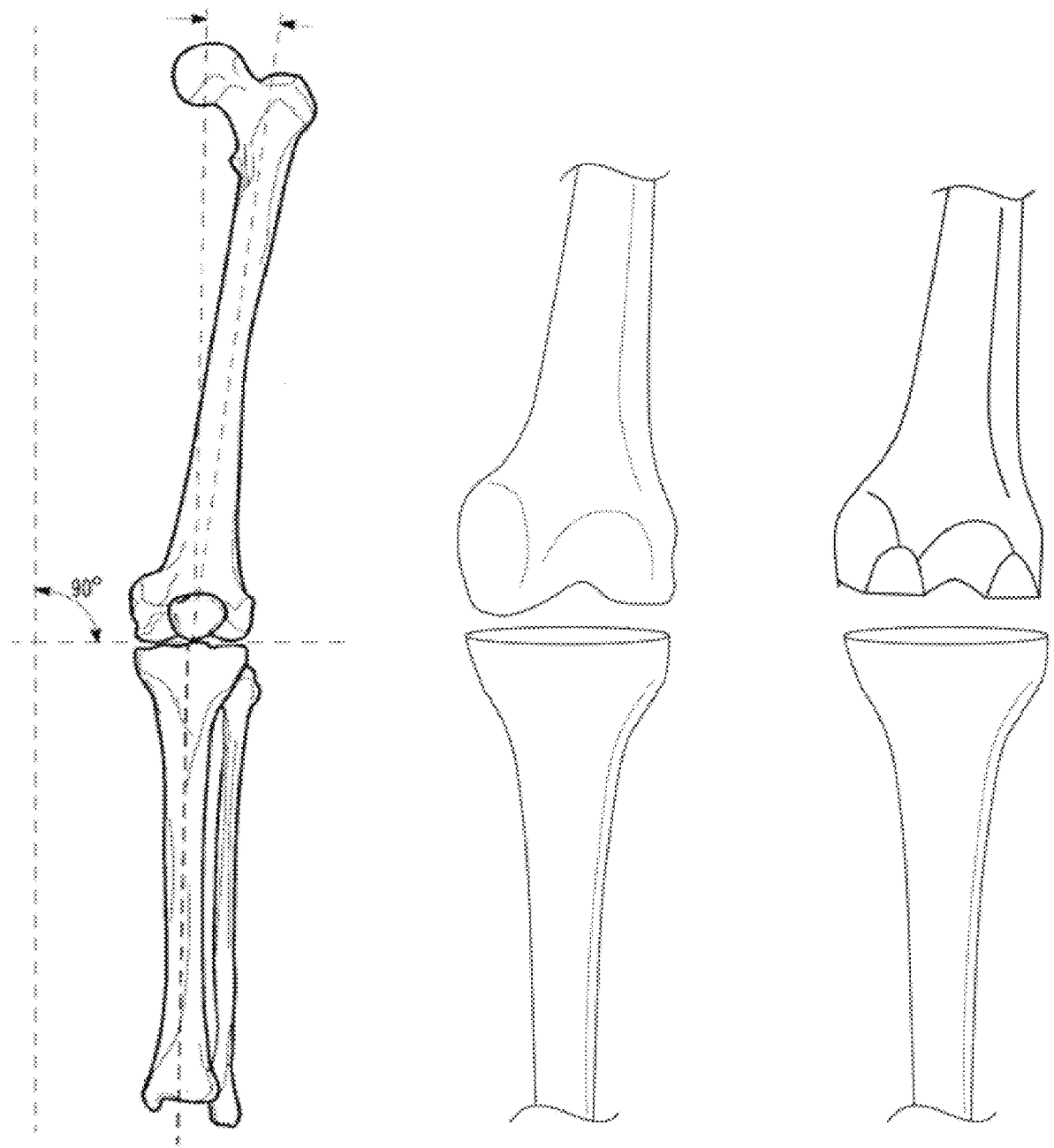
FIG. 21 shows successive cuts made during orthopedic surgery.

Whether the desired alignment is mechanical, anatomical, or kinematic (see left panel in FIG. 21), the cut between the bones should be parallel. Making a first cut (middle panel in FIG. 21) and then making the second cut (right panel in FIG. 21) may be challenging when they are done one after another, especially since the actual knee joint anatomy is not rectilinear.

Figure 22:
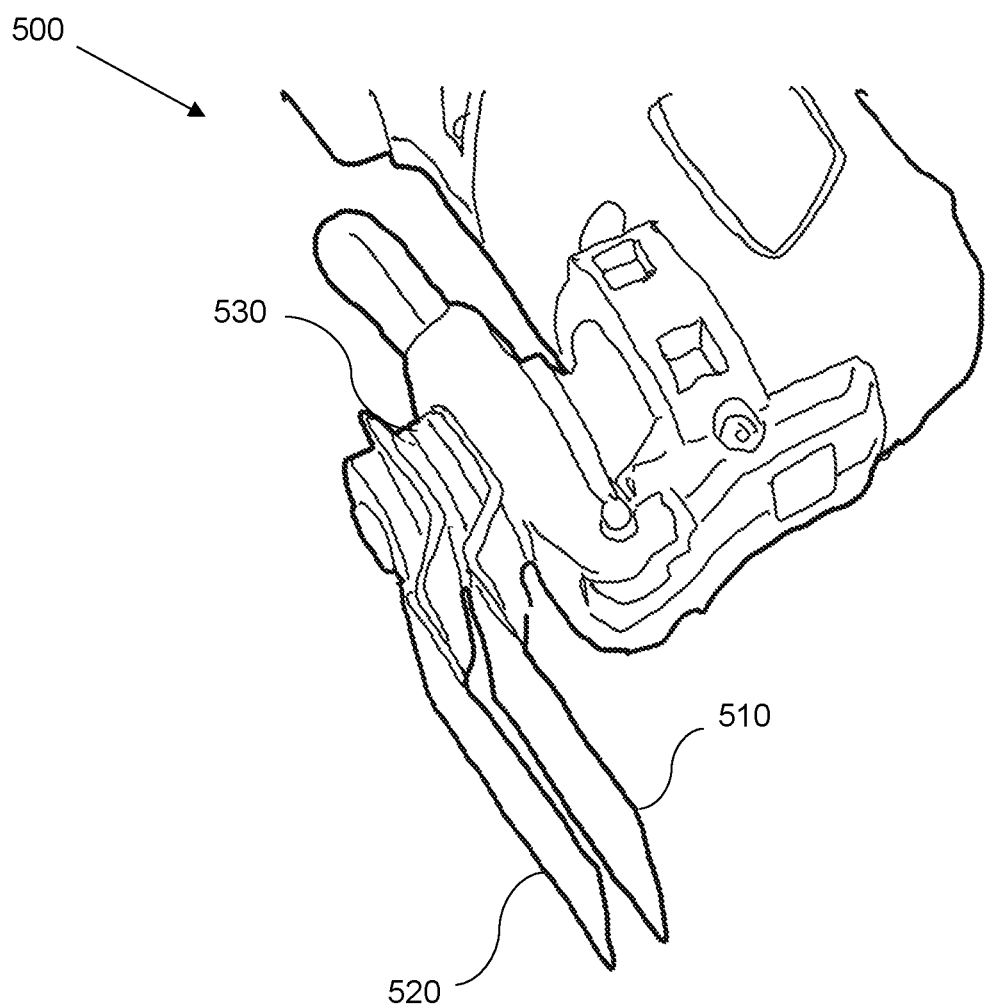
FIG. 22 shows a novel dual-blade saw that may be used during knee replacement surgery.

A dual-blade cutting device 500 may assist in making a precision cut during knee replacement surgery, as seen in FIG. 22. The saw 500 may include a first blade 510 separated from the parallel blade 520 by a spacer 530, which may be selected to have any desired thickness so as to define the distance between the cuts. To use this saw 500, the surgeon aligns the leg to the desired alignment, secures it, and makes the cut to both bones at the same time, thus achieving a parallel cut in a single operation that maintains the desired alignment between the bones.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A knee alignment measurement tool for use during a total knee replacement surgery, the knee alignment tool comprises:

a sensor assembly, in turn, comprising a rigid base supporting a circuit board, a left sensor and a right sensor positioned adjacent to the left center sensor, and a cover sealed to the rigid base to enclose the left sensor and the right sensor, wherein the cover is spaced apart from the rigid base to form a predefined gap therebetween, thereby the cover does not abut the rigid base during the compression of the sensor assembly, a display unit configured to power up, operatively control the individual sensors of the sensor assembly, and display the readings therefrom, and a flexible cable operatively connecting the sensor assembly to the display unit, wherein the knee alignment measurement tool is configured to provide feedback on compression forces between components of a knee replacement prosthesis and a balance of forces between a left condyle and a right condyle.

2. The knee alignment tool, as in claim 1, wherein the rigid base of the sensor assembly further comprises a side wall surrounding the left sensor and the right sensor, the cover is sized to fit inside the side wall of the rigid base defining the predefined gap in between sealed with a compliant adhesive.

3. The knee alignment tool, as in claim 1, wherein the cover of the sensor assembly contains at least one thicker portion surrounded by at least one thinner portion to allow the at least one thicker portion to transmit compression force applied on top thereof without affecting remaining areas of the cover.

4. The knee alignment tool, as in claim 3, wherein the cover is made from a polypropylene material with Young's modulus selected to be in a range from 1,325 MPa to 2,000 MPa.

5. The knee alignment tool, as in claim 4, wherein the thinner portion has a thickness in a range from 0.4 mm to 0.6 mm.

6. The knee alignment tool, as in claim 4, wherein the thicker portion has a thickness in a range from 1.5 mm to 3 mm.

7. The knee alignment tool, as in claim 3, wherein the cover of the sensor assembly comprises a first thicker portion surrounded by a first thinner portion and located above the left sensor of the sensor assembly, the cover of the sensor assembly further comprises a second thicker portion surrounded by a second thinner portion and located above the right sensor of the sensor assembly, thereby compression of the left sensor through the cover of the sensor assembly does not affect compression of the right sensor thereof.

8. The knee alignment tool, as in claim 3, wherein the thicker portions extend above a top surface of the cover and below a bottom surface thereof, thereby defining the areas of the cover that transmit compression forces to the sensors of the sensor assembly during knee replacement surgery.

9. The knee alignment tool, as in claim 8, wherein the rigid base further comprises a pair of feet protruding away from the rigid base, wherein each protruding foot is shaped as and vertically aligned with a corresponding thicker portion of the cover, thereby causing application of compression force to concentrate on each respective sensor located in between the respective thicker portion and the protruding foot.

10. The knee alignment tool, as in claim 1, wherein the gooseneck cable comprises a jacket containing a flex interconnect and a malleable wire configured to allow for diverse orientation and positioning of the display unit during the knee replacement surgery, the flex interconnect comprises a plurality of electrical connections between the sensor assembly and the display unit.

11. The knee alignment tool, as in claim 10, wherein the malleable wire is a copper wire with a hemispherical cross-sectional shape.

12. The knee alignment tool, as in claim 10, wherein the malleable wire extends from the sensor assembly through the jacket of the gooseneck cable into a loop retained in the display unit, and back through the jacket of the gooseneck cable to the sensor assembly, thereby facilitating using the gooseneck cable as a pull tail of the sensor assembly.

13. The knee alignment tool, as in claim 12, wherein the malleable wire is clamped using a center post of the sensor assembly.

14. The knee alignment tool, as in claim 13, wherein the center post is equipped with at least one claw configured to bite into the malleable wire to secure thereof upon positioning of the center post at the sensor assembly.

15. The knee alignment tool, as in claim 14, wherein the rigid base further comprises a clamp base positioned opposite the at least one claw of the center post and configured to provide retention of the malleable wire upon positioning of the center post at the sensor assembly.

16. A knee alignment measurement tool for use during a total knee replacement surgery, the knee alignment tool comprises:

a sensor assembly, in turn, comprising a rigid base supporting a circuit board, a left sensor and a right sensor positioned adjacent to the left sensor, and a cover sealed to the rigid base to enclose the left sensor and the right sensor, wherein the cover, in turn, comprises at least one thicker portion surrounded by at least one thinner portion forming a living hinge around the thicker portion to allow the thicker portion to transmit compression force applied on top thereof without deforming and affecting remaining areas of the cover, a display unit configured to power up, operatively control the individual sensors of the sensor assembly, and display the readings therefrom, and a flexible cable operatively connecting the sensor assembly to the display unit, wherein the knee alignment measurement tool is configured to provide feedback on compression forces between components of a knee replacement prosthesis and a balance of forces between a left condyle and a right condyle.

17. The knee alignment measurement tool, as in claim 16, wherein the cover comprises a first flat thicker portion located above the left sensor and surrounded by a first thinner portion, the cover further comprises a second flat thicker portion located above the second sensor and surrounded by a second thinner portion, wherein the first thicker portion is configured without deformation thereof to transmit compression force to the left sensor while being isolated from the right sensor via flexing of the first thinner portion forming a living hinge around the left sensor, and wherein the second thicker portion is configured without deformation thereof to transmit compression force to the right sensor while being isolated from the left sensor via flexing of the second thinner portion forming a living hinge around the right sensor, thereby compression of the left sensor does not affect compression of the right sensor and vice versa.

18. The knee alignment measurement tool, as in claim 17, wherein the flat thicker portion of each of the first thicker portion and the second thicker portion comprises a respective pair of a top surface and a bottom surface parallel to each other.

\* \* \* \* \*